United States Patent

De Groot et al.

(10) Patent No.: US 9,141,106 B2
(45) Date of Patent: Sep. 22, 2015

(54) METHOD FOR OPERATING A FIELD DEVICE

(75) Inventors: Vincent De Groot, St. Louis (FR); Jorg Hahniche, Bad Krozingen (DE); Mathhias Romer, Grunberg (DE); Raimund Sommer, Maulburg (DE)

(73) Assignee: Endress + Hauser Process Solutions AG, Reinach (CH)

( * ) Notice: Subject to any disclaimer, the term of this patent is extended or adjusted under 35 U.S.C. 154(b) by 637 days.

(21) Appl. No.: 12/735,881

(22) PCT Filed: Feb. 5, 2009

(86) PCT No.: PCT/EP2009/051335
§ 371 (c)(1),
(2), (4) Date: Aug. 23, 2010

(87) PCT Pub. No.: WO2009/106414
PCT Pub. Date: Sep. 3, 2009

(65) Prior Publication Data
US 2011/0004685 A1  Jan. 6, 2011

(30) Foreign Application Priority Data
Feb. 25, 2008  (DE) .......... 10 2008 010 864

(51) Int. Cl.
*G05B 19/418* (2006.01)
*G05B 19/042* (2006.01)
*G06F 21/62* (2013.01)

(52) U.S. Cl.
CPC .......... *G05B 19/418* (2013.01); *G05B 19/0425* (2013.01); *G06F 21/6218* (2013.01); *G05B 2219/25428* (2013.01); *G05B 2219/31104* (2013.01); *G06F 2221/2141* (2013.01)

(58) Field of Classification Search
USPC .......................................... 709/225
See application file for complete search history.

(56) References Cited

U.S. PATENT DOCUMENTS

| 5,980,078 | A  | * | 11/1999 | Krivoshein et al. | ............... 700/1 |
| 6,370,448 | B1 | * | 4/2002  | Eryurek          | ............... 700/282 |
| 7,010,294 | B1 | * | 3/2006  | Pyotsia et al.   | ............... 455/420 |
| 7,536,274 | B2 | * | 5/2009  | Heavner et al.   | ............... 702/183 |

(Continued)

FOREIGN PATENT DOCUMENTS

| DE | 100 63 982 A1 | 7/2002 |
| DE | 101 44 971 A1 | 3/2003 |

(Continued)

OTHER PUBLICATIONS

An algorithmic framework for robust access control in wireless sensor networks; Published in: Wireless Sensor Networks, 2005. Proceeedings of the Second European Workshop on Date of Conference: Jan. 31-Feb. 2, 2005.*

(Continued)

*Primary Examiner* — Kevin Bates
*Assistant Examiner* — S M Rahman
(74) *Attorney, Agent, or Firm* — Bacon & Thomas, PLLC

(57) ABSTRACT

Method for operating a field device of process automation technology, wherein the field device is connected for communication with at least one servicing tool. In the case of a request by a servicing tool for access to the field device, the access allowed by the field device depends on the particular servicing tool which places the access request, and on the operating state, in which the field device is located.

11 Claims, 1 Drawing Sheet

(56) References Cited

U.S. PATENT DOCUMENTS

| | | | |
|---|---|---|---|
| 2004/0030422 A1* | 2/2004 | Simon | 700/52 |
| 2004/0204775 A1* | 10/2004 | Keyes et al. | 700/29 |
| 2005/0033886 A1* | 2/2005 | Grittke et al. | 710/107 |
| 2005/0048963 A1* | 3/2005 | Kubler et al. | 455/423 |
| 2009/0158011 A1* | 6/2009 | Jennings et al. | 712/220 |

FOREIGN PATENT DOCUMENTS

| | | |
|---|---|---|
| DE | 10229704 A1 | 1/2004 |
| DE | 10 2004 019 391 A1 | 11/2005 |
| DE | 10 2005 014 050 A1 | 9/2006 |
| DE | 10 2005 047 533 A1 | 1/2007 |
| WO | WO 2007/036178 A1 | 4/2007 |
| WO | WO 2007/128544 A1 | 11/2007 |

OTHER PUBLICATIONS

An Access Control Protocol for Embedded Devices; Published in: Industrial Informatics, 2006 IEEE International Conference on Date of Conference: Aug. 16-18, 2006.*
International Search Report, May 7, 2009.
German Search Report, Nov. 14, 2008.
English translation of IPR, Feb. 5, 2009.

* cited by examiner

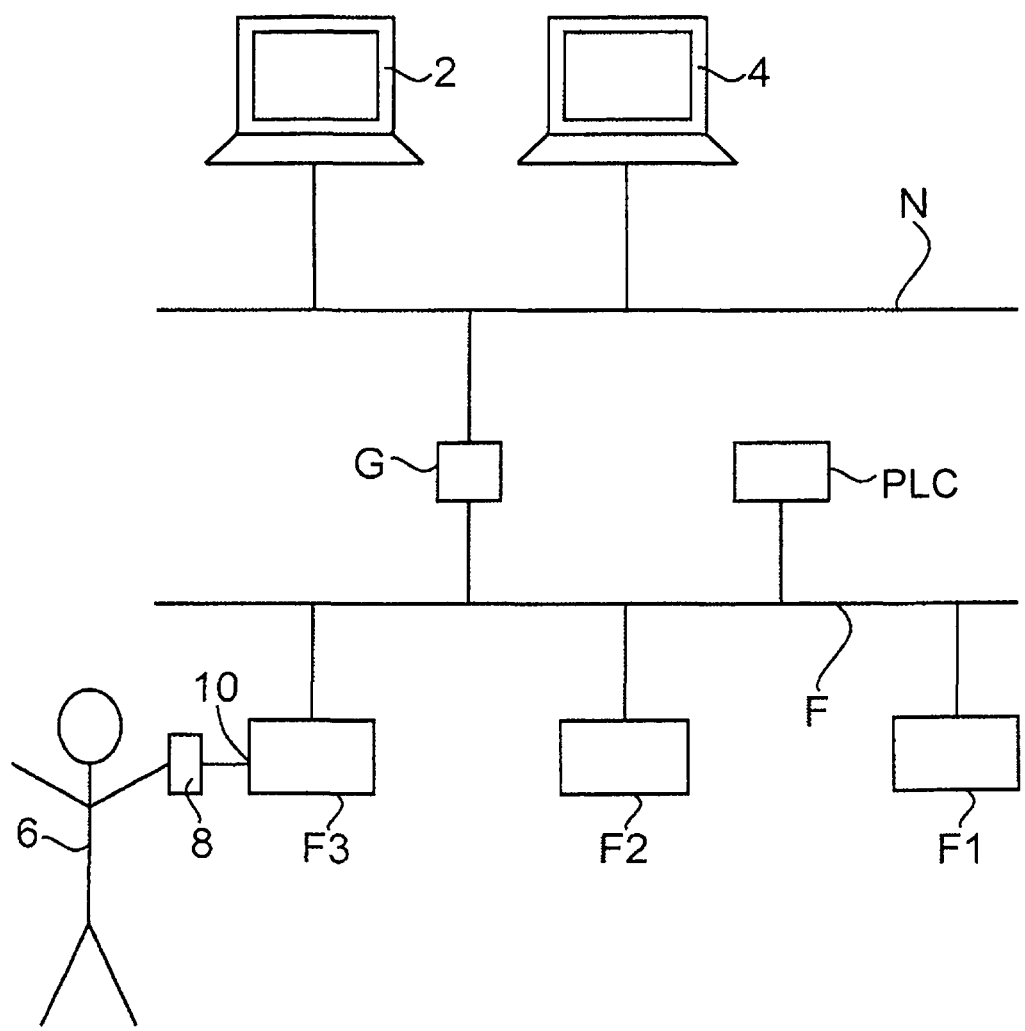

METHOD FOR OPERATING A FIELD DEVICE

TECHNICAL FIELD

The present invention relates to a method for operating a field device of process automation technology, as well as to a field device of process automation technology.

BACKGROUND DISCUSSION

In process automation technology, field devices are often employed, which serve to register and/or influence process variables. Serving for registering process variables are sensors, such as, for example, fill-level measuring devices, flow measuring devices, pressure and temperature measuring devices, pH-redox potential measuring devices, electrical conductivity measuring devices, etc., which register the respective process variables, fill-level, flow, pressure, temperature, pH-value and conductivity. Serving for influencing process variables are actuators, for example valves or pumps, via which the flow of a fluid in a section of pipeline or the fill-level in a container can be changed. In principle, all devices which are employed near the process and which deliver or work with process-relevant information are referred to as field devices. In addition to the aforementioned sensors and actuators, generally, units that are directly connected to a fieldbus and which serve to communicate with the superordinated units (e.g. remote I/Os, gateways, linking devices, etc.) are also referred to as field devices. A large number of these devices are produced and sold by the Endress+Hauser Group.

In modern industrial facilities, field devices are, as a rule, connected with superordinated units via fieldbus systems. Normally, the superordinated units involve control systems or control units, for example a PLC (programmable logic controller) or a DCS (Distributed Control System). The superordinated units are used, among other things, for process control, process visualizing, process monitoring as well as in the start-up of the field devices. One or more of such superordinated units can, in such case, be directly connected to the fieldbus, to which the field devices are connected, and/or be connected to a superordinated communication network.

In a field device, a plurality of parameters are provided. Parameters of a field device include, for example, a measuring range, limit values, units, etc. By writing and reading the parameters of a field device—which is also referred to as configuring (or parametering) the field device—the functionality of the field device can, in each case, be adapted correspondingly to the intended use. The configuring of a field device is, as a rule, performed during the start-up of the field device. To the extent that changes should be performed during operation, a configuration can also partially occur during operation. A changing, activating and/or deactivating of parameters of a field device occurs, in such case, by a write accessing of the parameters. By a read accessing, parameters of the field device can be read out; a change in the parameters does not, in such case, occur.

For accessing parameters of field devices—especially for reading and writing parameters of field devices—servicing programs, which are also referred to as servicing, or operating, tools, are provided. Such servicing tools can, in such case, be implemented on the field device itself, on a superordinated unit and/or on a servicing device, such as, for example, a portable personal computer (laptop), a portable handheld servicing device (handheld), a PDA (Personnel Digital Assistant), etc. An accessing of parameters of a field device via the servicing tools can, in such case, occur automatedly, in the context of an application, or manually, by a user. As a rule, servicing tools make available to a user (who would like access to parameters of a field device) a corresponding user interface. A communication connection between a servicing device (e.g. a personal computer, portable handheld servicing device or PDA) and the field device is produced either via the fieldbus, to which the field device in question is connected, or directly via a corresponding service interface of the field device. A servicing tool which is implemented on the field device itself enables a user to access the field device on-site. In addition to providing access to field devices as explained, servicing tools can also have still other functions.

Until now, access rights are statically defined in a field device, which means, especially, that once set, or defined, access rights to parameters of the field device remain unchanged over time (assuming they are not changed again). During the start-up of a field device, a parameter change is relatively non-critical, since such a change does not directly affect the process of a plant. In some operating states of a field device, however, parameter changes are to be conducted only as a matter of exception and with high care, especially in an operating state in which the field device is integrated into the process of a plant, and changes to the parameters settings can directly affect the process (operating state: on control). In this case, a parameter change which is incorrect or which is undergone at an incorrect point in time can have an unforeseeable effect on the process. A static definition of access rights thus has the disadvantage, that in some situations, in which parameter changes are relatively non-critical, more extensive access rights are desirable; whereas in other situations, in which parameter changes are critical, the defined access rights are possibly too extensive.

In a plant of process automation technology, a field device is, as a rule, connected for communication not only with one, but rather with a plurality of servicing tools. In such case, a coordination of accessings by the different servicing tools often does not occur. This can lead to two servicing tools accessing parameters of a field device simultaneously, or at such short time intervals, that an unpredictable behavior and/or an error occurs in the current application. For example, it can occur that a first servicing tool accesses the field device, and loads all or a part of the parameters of the field device into the associated processor unit, on which the servicing tool is implemented. These data are then available as offline data, which means that a change of the same data (in the processor unit) does not directly affect the associated parameters in the field device. The parameters are then, for example, changed offline by way of the servicing tool, and then loaded back into the field device. After this loading, the changed parameters then exist as online data in the field device. If, in parallel— that is, at the same time or overlapping in time—to the parameter change via the first servicing tool, another parameter change is also performed in the field device via a second servicing tool, it can then occur that the parameter change of the first or the second servicing tool is unintentionally overwritten, or that the parameter change of the first servicing tool is not compatible with the parameter change of the second servicing tool. This can lead to unpredictable behavior in the process, or to the occurrence of errors.

Until now, existing measures have not been sufficient to reliably avoid the above-mentioned causes for possible error. In known servicing tools, an identification method, by which users must first identify themselves (for example, through a password or through biometric data) is, as a rule, provided. Depending on the type of task and the technical knowledge of the relevant person, predetermined accesses are enabled via the servicing tool. In this way, for individual persons, only such accesses are enabled for which, in each case, these persons are authorized. This mechanism does not prevent, however, that two or more persons access in parallel the same field device via different servicing tools. Additionally, this mechanism cannot prevent that a user unintentionally changes parameters of a field device which is currently in the operating state "on control", and that errors in the process are caused thereby.

Additionally, the use of so-called hardware-switches in field devices is also known. Such involves, for example, mechanical switches, which are placed directly on the field device, and whose actuation leads to the field device being blocked from parameter changes of any type. Disadvantageous in such case, is, however, the fact that, in order to both block parameter changes as well as for canceling this blocking, the field device in question must, in each case, be located on-site, and the relevant switches must be actuated. Additionally, such a switch cannot effectively and reliably eliminate the causes for error set forth above.

SUMMARY OF THE INVENTION

On the basis of these considerations, an object of the present invention is to provide a method and a field device by which errors, which can occur when accessing the field device, are more effectively prevented.

In the present invention, a method is provided for operating—especially for configuring—a field device of process automation technology, this field device being connected in communication with at least one servicing tool. In the case of a request by a servicing tool for access to the field device, the access allowed by the field device depends, in such case, on the particular servicing tool placing the access request, and on the operating state, in which the field device is located.

In comparison to the static definition of access rights in the state of the art (which is explained above), in the present invention, it is taken into consideration, among other things, in which operating state the field device is located. In this way, it can especially be provided, that in operating states, in which an accessing (especially involving parameter changes) is comparatively non-critical, more extensive accessings (or access rights) of the field device are defined than in operating states, in which an accessing (especially involving parameter changes) is comparatively critical, because, for example, these accessings directly affect the process of a plant. Various possible operating states of a field device are explained below.

Additionally taken into consideration in the present invention is from which servicing tool an access request is placed. In this way, for example, during the definition or setting of the accesses (or access rights) to be allowed, one or more of the following criteria are, in each case, specifically taken into consideration: The functions, which the relevant servicing tool provides with regard to an accessing of the field device (especially with regard to an accessing of parameters of the field device); the control functions or control tasks, which the servicing tool performs within the plant; the hardware, on which the servicing tool is implemented; as well as the communication connection, via which the servicing tool communicates with the field device. On the basis of these considerations, the access rights for different servicing tools can, in the present invention, differ from one another. As is explained below in more detail, through the present invention, a parallel (that is a simultaneous or overlapping in time) accessing of the field device by a plurality of servicing tools can be prevented. Through this specific and situation-dependent allowing of access, the occurrence of errors in the case of an accessing of the field device by at least one servicing tool can be more effectively prevented.

Preferably, it is provided that the field device is connected for communication with a plurality of servicing tools, wherein the access allowed by the field device differs in the case of at least two of the servicing tools.

In the present context, the term, "servicing tool", refers generally to a program, or tool, with which an accessing of field devices—especially an accessing of parameters of field devices—can be performed. In the present context, it is, in such case, unimportant, in which type of hardware the servicing tool is implemented. As is explained above, the servicing tool can, for example, be implemented in the field device itself, in a superordinated unit and/or in a servicing device, such as, for example, a portable personal computer (laptop), a portable handheld servicing device (handheld), a PDA, etc. In such case, a number of different servicing tools can, in each case, be implemented on different—or, alternatively, on the same—hardware, such as, for example, a personal computer or a computer unit. Through a servicing tool, especially the reading and writing (changing, activating and/or deactivating) of parameters of the field device can be performed. Along with this, a servicing tool can also have still other functions. Especially, the individual servicing tools, which communicate with the field device, can differ in the functions which are provided by them.

The communication connection between the servicing tool and the field device can be implemented in different ways. It can, for example, occur via a fieldbus (hardwired or wireless). This is, for example, the case, when the servicing tool is implemented on a portable personal computer or a PDA, which is connected to the fieldbus of the field device via a corresponding interface. Alternatively, the communication connection can be formed via a service interface of the field device, to which a corresponding servicing device—such as, for example, a portable handheld servicing device—is connected. If the servicing tool is implemented on a computer unit, this computer unit can then also be connected to a superordinated network, and, via this network (and the fieldbus), it can communicate with the field device. Additionally, the communication connection can extend within the field device. Via a servicing tool implemented on the field device, a person can, by operating a display and service unit of the field device, have access to the field device, and especially display, change, activate and/or deactivate parameters of this same field device. As a rule, fewer functions are provided by a servicing tool which is implemented in the field device itself than, for example, by a servicing tool which is implemented in a computer unit or a personal computer.

An "accessing" includes at least one accessing of parameters of the field device, which especially includes the writing (activating, deactivating and/or changing) and/or reading of parameters of the field device. Such parameters of the field device can especially concern "audit-trail" data, by which the chronological course of parameter changes is documented, engineering data and/or process data.

Engineering data especially includes field device configuration, fieldbus configuration and/or configuration of an application. Parameters, which concern process data, can be, especially, units of the issued, measured values, status and diagnostic information, alarm and error reports, etc.

The access allowed by the field device can, depending on the servicing tool which places the access request and depending on the operating state of the field device, be embodied in different ways. For example, in some situations (that is, particular servicing tools or particular operating states of the field device), all accessing of the field device can be blocked, while in other situations, a limited accessing is allowed. The allowed accessing can also additionally be dependent on other conditions.

In an advantageous further development, it is provided that, depending on the servicing tool which places the access request and/or depending on the operating state of the field device, the access allowed by the field device includes only a part of the parameters of the field device. In this way, differences in the individual parameters can also be taken into consideration. As is explained above, there exist, for example, parameters (in the following: "critical parameters") in the field device, whose being changed directly affects the process of the plant. These "critical parameters" can, for example, be parameters of a function block (for example, "scaling parameters", "channel parameters", etc.), which is implemented in the field device and integrated into the process. Additionally, they can be parameters, which concern units or limit values of issued, measured values, and/or, if the field device communicates via a fieldbus, parameters which relate to the bus configuration. An accessing of critical parameters can, for example, in the operating state "on control", be completely blocked or only permitted for qualified personnel, while an accessing of other parameters of the field device, whose being changed does not affect the process, is allowed. Such non-critical parameters can, for example, be parameters of the field device which relate to a field device function block, which is not integrated into the process, to the extent that these parameters do not concern the activation or integrating of the function block.

Additionally or alternatively, it can be provided that an accessing of some parameters of the field device is only allowed, when the relevant servicing tool fulfills one or more of the criteria regarding servicing tools which are listed above for claim 1, whereas an accessing of other parameters is allowed independent of the fulfillment of such criteria. In some situations (i.e., particular servicing tools or particular operating states of the field device), another option is to block an accessing of all parameters of the field device.

In an advantageous further development, it is additionally provided that, depending on the servicing tool that places the access request and/or depending on the operating state of the field device, the access allowed by the field device includes only certain types of access. The terminology, "types of access", includes, especially, a read access and a write access of parameters of the field device. Write access especially includes the activation, deactivation and/or changing of one or more parameters. In such case, for example, in the operating state "on control", write access can be completely blocked, while read access is still allowed. Additionally or alternatively, it can, for example, be provided, that write access by a servicing tool of parameters of the field device is only allowed, when the relevant servicing tool fulfills one or more of the criteria regarding servicing tools which are listed above for claim 1, whereas read access to parameters of the field device is allowed independently of the fulfillment such criteria.

Preferably provided in this further development is the allowance of specific access types combined with the further development explained above, which relates to the allowance of access to only a part of the parameters of the field device. For example, in the operating state "on control", only read access can be allowed to critical parameters, while write access is also allowed to other (non-critical) parameters.

In an advantageous further development, it is provided that, when an access request is made, the at least one servicing tool transmits an identification of the servicing tool to the field device. On the basis of this identification, the field device can detect which servicing tool—especially which type of servicing tool—is placing the access request. The field device, as a function of this identification and as a function of the operating state in which the field device is running, then allows an accessing. In the case of fieldbus systems, during the placing of an access request, the identification of the sender—that is the servicing tool—is, as a rule, transmitted (this is generally referred to as an identification procedure), so that a simple implementation of the method of the invention is thereby enabled.

It can, in such case, be provided, for example, that, for each identification, the corresponding accesses which are, in each case, to be allowed for the different operating states of the field device (and, in given cases, for other criteria to be considered) are defined in the field device. Such an association can, in such case, for example, occur tabularly. Alternatively, this association can also occur on the basis of predetermined algorithms, which are implemented in the field device.

In an advantageous further development, it is provided that profile information is stored for the at least one servicing tool in the field device, wherein the profile information contains information regarding the functions of the relevant servicing tool with regard to an accessing of field devices, and that the field device, upon obtaining an access request by a servicing tool, accesses the profile information of this servicing tool, and, as a function of this profile information, allows an accessing by the servicing tool. This further development has the advantage, that such profile information can be provided from a manufacturer of the servicing tool. The user of the servicing tool must then only load the profile information into the field device. If an access request is placed from a servicing tool, it can then be determined in the field device as a function of the associated profile information and on the basis of predetermined criteria, which accesses are allowed in which operating states of the field device. This determining can occur in the field device through a tabular association of the accesses to be allowed with the respective profile information and operating states, or on the basis of predetermined algorithms, which are implemented in the field device, and which are to be applied to the respective profile information and operating states. This further development accordingly enables, that, in the field device, generic tabular associations or algorithms are defined, on the basis of which can be ascertained which accesses, in each case, are to be allowed for different servicing tools. If a unified form for representation of the profile information is selected to be independent of manufacturer, the integration of servicing tools from various manufacturers into the method of the invention is then enabled in simple manner.

The profile information can include other information, in addition to information regarding the functions of the relevant servicing tool with regard to an accessing of field devices. Preferably associated with the profile information are, in each case, identifications of the associated servicing tools. In this way, the field device, in the case of obtaining an access request with the identification of the relevant servicing tool, can, on the basis of the identification, assign the associated profile information.

Profile information for servicing tools can, for example, be given according to the document "Foundation® Fieldbus Host Interoperability Support Test Profile and Procedures; document FF-569; 16 May 2007; revision: FS 2.0" (referred to in the following as "FF-document") or according to subsequent revisions of this FF-document. Defined in the FF-document are, among other things, properties, which can be implemented in a servicing tool (also referred to as "host").

Additionally, associated tests for these properties are given in the FF-document. It may only be claimed that a servicing tool exhibits a property defined in the FF-document when it has passed the associated tests. Through the individual tests, it is especially checked whether the relevant servicing tool fulfills interoperability requirements in the case of interaction with other servicing tools and field devices. Additionally provided in the FF-document are various profile classes ("host profile classes"), into which servicing tools are divided, according to their properties. Profile information according to this FF-document is, as a rule, provided by the manufacturers of servicing tools, so such information need not be separately created. Recourse to this profile information is advantageous, since this profile information is applicable independently of manufacturer and has been verified by tests according to the FF-document. To the extent that corresponding profile information is (or is to be) defined in other bus systems (such as, for example, Profibus®, HART®, etc.), these can be used in a corresponding manner.

In an advantageous further development, it is provided that, in the case of obtaining an access request from a servicing tool, an accessing by other servicing tools is blocked in the field device or enabled only to limited extent. In this way, it is prevented that errors occur in the field device due to parallel (that is simultaneous or overlapping in time) accessing by different servicing tools. Also preferable is that, in the case of an access request being placed, an identification of the relevant servicing tool is, in each case, transmitted by the different servicing tools. In addition to blocking all access, allowing only limited access is also possible. A limited accessing, for example, can be limited to certain access types (such as, for example, read access), or it can be limited to a part of the parameters of the field device.

Preferably, this further development is implemented in such a manner, that a further operating state, in which an accessing by other servicing tools is blocked or enabled only to a limited degree, is provided in the field device. In the case of obtaining an access request from a servicing tool, the field device is switched into this additional operating state.

In an advantageous further development, it is provided that the blocking or limitation of access to the field device can only be canceled by the servicing tool which has placed that access request, due to which the accessing was blocked or limited. In this way, it is assured that accessing of individual servicing tools can, in each case, be executed in entirety, without this procedure being disturbed by other servicing tools. Thereby, it can additionally be prevented that two or more accesses, in the case of which the danger exists that they mutually influence or disturb each other, overlap in time. Preferably, the servicing tool also transmits its identification together with the report that a blocking or limitation is to be canceled. As a rule, after execution of the access procedure, the "session" with the field device is ended by the servicing tool. In such case, it can be provided that, in the case of the session being terminated by the servicing tool, the blocking or limitation of access is also simultaneously canceled in the field device.

In an advantageous further development, it is provided that the field device, in the case of receiving an access request from a predetermined servicing tool, allows an accessing by this predetermined servicing tool independently of whether an access request was parallelly placed by another servicing tool. In this way, it can, for example, be assured, that certain parameter settings which are important for the running process can be performed by a predetermined servicing tool without a (or with only a small) time delay. Such important parameters settings can, for example, concern application-related parameters, such as units of measured values, limit values of measured values and/or link information, etc. In such case, a number of predetermined servicing tools can also be used parallely in a plant.

Preferably, in such case, it is provided that, when an access request is received by the predetermined servicing tool, an (in given cases, just processed) access request by another servicing tool is prematurely ended. It can additionally be provided that a just processed access request by another servicing tool is only ended prematurely, when the predetermined servicing tool transmits, together with the access request, a report stating that the access request is urgent or important. Such an early termination can be implemented, for example, in such a manner, that the original parameter settings are maintained, and such other servicing tool must repeat the access request at a later point in time.

In an advantageous further development, it is provided that, when an accessing is blocked or enabled only to a limited degree, the field device gives a corresponding notification concerning the blocking or limitation. Preferably, in the notification, an identification is given of the servicing tool, which has placed the access request due to which the accessing was blocked or limited. The notification can be given, for example, on a display of the field device. Additionally, it can be provided that, when another servicing tool places a request for access to the field device, the field device transmits to this other servicing tool (e.g. via a fieldbus or a service interface) with the notification a report regarding the blocking or limitation. Giving such a notification has the advantage that a user or an application is directly informed that an accessing is not possible or is only possible to a limited degree at the particular point in time. Additionally, still other information—such as, for example, the probable duration of the access—can also be given in the notification.

In an advantageous further development, it is provided that, included among those operating states of the field device, as a function of which an accessing is allowed, is at least one of the following operating states: An "offline" operating state, in which the field device is not connected in a plant of process automation technology; an "online" operating state, in which the field device is connected in a plant of process automation technology; a "commission" operating state ("start-up" operating state), in which parameters of the field device are set before integration of the field device into a process; a "non-commission" operating state (operating state before start-up), in which a field device, which has not previously been in operation, is present; a "off-control" operating state, in which the field device is "online", but is, however, not yet integrated into a process; an "on-control" operating state, in which the field device is "online" and integrated into a process; and an operating state in which access is blocked or limited, in which the field device is operated, when a request for access to the field device is placed by a servicing tool.

"Connected in a plant of process automation technology" means here that the field device is connected in the plant as regards its hardware. In the case of a hardwired connection of the field device, this means, for example, that the field device is connected by cable. During the "commission" operating state, among other things, parameters of the field device are set (for example, via a corresponding servicing tool) so that the field device can then fulfill the desired functionality in an "on-control" operating state. During the "commission" operating state, the field device can be either "online" or "offline". In the present context, "integrated into a process" means that the field device actually interacts with the process (of a plant of process automation technology), which means that its control loops are integrated into the process. In the case of the field device being a sensor, this can, for example, include registering measured values and transmitting these to other plant devices, in which the measured values are to be made use of. In the case of the field device being an actuator, the interaction with the process can include acting on the process, such as, for example, changing an amount of flow in a section of pipeline as a function of received control signals. As can be seen from the explanations, a field device can also be parallelly operated in several of the operating states set forth above.

In an advantageous further development, it is provided that, in the case of an access request which is initiated by a person, this person must identify him/herself, and the access allowed by the field device depends on the identity of this person. It can, for example, in such case be provided, that the person must identify him or herself through biometric data (such as, for example, a finger print), or with a password. In the field device—or also in the servicing tool—access rights can be defined for different persons or groups of persons in a predetermined manner. The accessing allowed by the field device then occurs only within the context of these predetermined access rights. By additionally taking into consideration the identity the person, by whom an access request is initiated, an unauthorized accessing by a non-authorized person is prevented.

The present invention additionally relates to a field device of process automation technology, wherein the field device includes a processor unit. The processor unit is, in such case, adapted in such a manner, that, in the case of a request by a servicing tool for access to the field device, the access to the field device allowed by the processor unit depends on the particular servicing tool which places the access request, and on the operating state, in which the field device is running. The terminology, "processor unit", means, in general, a data processing unit (such as, for example, a CPU, a microprocessor, etc.). The advantages, variants and further developments of the method of the invention explained above are also implementable in corresponding manner in the system of the invention.

The functionality implemented in the field device, as well as the corresponding interaction between servicing tool and field device, which are provided in the present invention and/or in one of the further developments, can, for example, be described in a device description (DD) of the field device. The device description is, as a rule, created in a text-based form (e.g. in the ASCII-text format). For this purpose, depending on the fieldbus system used, different device description languages are used, such as, for example, the HART® Device Description Language, Foundation Fieldbus Device Description Language, Electronic Device Description Language (EDDL), Field Device Configuration Markup Language and GSD/Profibus® (GSD: General Station Description). In order that a servicing tool can access the information contained in the device description, an interpreter is, as a rule, provided, through which the information provided in the device description is interpreted or translated, and supplied to the servicing tool.

Alternatively, the functionality implemented in the field device—as well as the corresponding interaction between the servicing tool and field device, as provided in the present invention and/or in one of the further developments—can be described and implemented in a device driver of the field device, especially in a "Device Type Manager" (DTM). A device driver—especially a "Device Type Manager"—is, in such case, device-specific software, which encapsulates data and functions of the field device and provides graphical servicing elements. A servicing tool must, in this case, be embodied in such a manner, that it forms a suitable frame application for the device driver. For example, a "Device Type Manager" requires a FDT frame application (FDT: Field Device Tool) in order to run. One servicing tool which forms such a FDT-frame application is, for example, the "Field-Care®" application of Endress+Hauser.

BRIEF DESCRIPTION OF THE DRAWINGS

Other advantages and utilities of the invention will become evident on the basis of the appended drawing, the sole FIGURE of which shows as follows:

FIG. 1 is a schematic representation of a fieldbus network for purposes of explaining a form of embodiment of the present invention.

DETAILED DISCUSSION IN CONJUNCTION WITH THE DRAWING

In the representation in FIG. 1, three field devices F1, F2 and F3, as well as a programmable logic controller PLC, are connected to a fieldbus F. The fieldbus F works according to the Profibus® standard. The control unit PLC is a master, while the field devices F1, F2 and F3 are slaves. Communication between the control unit PLC and the field devices F1, F2 and F3 occurs according to the Profibus® standard. The fieldbus F is connected via a gateway G to a superordinated network N. In addition to the fieldbus F, other fieldbusses (not shown) can also be connected with the superordinated network N. Connected to the superordinated network N is a first personal computer 2, on which a first servicing tool is implemented. Connected to the superordinated network N is furthermore a second personal computer 4, on which a second servicing tool is implemented. In the situation presented in FIG. 1, the field device F3 is sought out by a person in the form of a service technician 6, who carries a handheld servicing device 8. On the handheld servicing device 8, a third servicing tool is implemented, through which the reading and writing of parameters of the field device F3 is enabled. For this, the handheld servicing device 8 (as it is presented in FIG. 1) is connected to a service interface 10 of the field device F3.

In the present example of an embodiment, it is provided, that the first servicing tool primarily performs tasks of process control, both open and closed loop. In such case, the first servicing tool monitors measured values, as well as status and diagnostic information in the plant. Additionally, the first servicing tool has visualizing and monitoring systems. Such a servicing tool is provided by the firm Endress+Hauser, for example, in the form of the servicing tool, "FieldControl®". Additionally, it is provided that the first servicing tool performs the configuration of an application, which especially includes combining individual function blocks of field devices in such a manner, that a desired application is thereby implemented. Software, with which such a configuration of an application is put into practice, is provided by the firm, Endress+Hauser, for example, in the form of the servicing tool "Application Designer®".

Assumed by the second servicing tool are primarily tasks of plant asset management. Such a servicing tool is provided by the firm Endress+Hauser, for example, in the form of the servicing, or operating, tool "FieldCare®. Along with this, parameters of the individual field devices can also be read and written via the second servicing tool.

An accessing of the field devices of the plant, and especially of the field devices F1, F2 and F3 can, thus, occur both from the first as well as from the second servicing tool. An accessing especially includes, in such case, the writing and reading of parameters of the relevant field devices. Additionally, with the third servicing tool (which is implemented on the handheld servicing device 8), the field device F3 can be accessed. Additionally, the field device F3 can also be accessed via a fourth servicing tool which is implemented on the field device F3 itself; wherein, for this purpose, a person must operate a display and service unit (not shown) of the field device F3.

In the following, an example of the procedure of the method of the invention will now be explained. The first servicing tool sends to the field device F3 a write request for a parameter of the field device F3. Together with the write request, the servicing tool transmits its identification. Upon receiving the write request, all write access for other servicing tools is blocked in the field device F3. The field device F3 has stored in a memory, profile information for the different servicing tools in the plant. Associated with the profile information is, in each case, an identification of the corresponding servicing tool. The identifications of the different servicing tools are, in each case, granted only uniquely within the plant. The field device F3 can thus access the associated profile information via the received identification. As a function of the profile information, and also as a function of the operating state in which the field device F3 is running, access rights are defined in the field device F3. The field device is, at this moment, running in an "on-control" operating state. The relevant parameter of the field device to be changed through the received write request is not critical for the current application, which means a change of the same does not directly affect the process of the plant. The write access for the first servicing tool is included in the predefined access rights in the field device and can thus be executed without limitation.

While a write accessing is being performed via the first servicing tool, a read request for a parameter is made to the field device F3 by the second servicing tool. The field device F3 again tests (as a function of the operational status, in which the field device F3 is running, and as a function of the profile information of the second servicing tool) whether the read request is included in the predefined access rights. A reading of parameters is here non-critical for the process. The read access is included in the predefined access rights and can be executed without limitation.

While performing the write accessing via the first servicing tool, the service technician 6 would additionally like to perform a change of a parameter of the field device F3 via the handheld servicing device 8, and therewith, via the third servicing tool. After placement of a write request to the field device F3 by the third servicing tool, the field device F3 tests (as a function of the operating state, in which the field device F3 is running and as a function of the profile information of the third servicing tool) whether the write request is included in the predefined access rights. As is explained above, the field device F3 is running in an operating state with write access blocked. The field device F3 is thus blocked for an additional writing procedure. The service technician 6 is informed both via a display of the field device F3 as well as via a display of the handheld servicing device 8 that the field device F3 is, at the moment, blocked by the first servicing tool, and that write access is not possible. As soon as the session with the first servicing tool is ended, the blocking in the field device F3 is canceled. A corresponding report is displayed both on the display of the field device F3, as well as on the display of the handheld servicing device 8.

The present invention is not limited to the example of an embodiment as explained here with reference to FIG. 1. The present invention is especially not only applicable in the case of sensors and actuators serving as the relevant field devices. Rather, the advantages set forth above will also become evident in the case of remote I/Os, gateways and linking devices. For example, a remote I/O, which is connected to a fieldbus and which, via analog lines, is connected with one or more simple field devices, can be operated according to the method of the invention. Instead of the Profibus® bus system, another bus system, such as, for example, a HART® bus system, a Foundation Fieldbus bus system, etc., can also be applied.

The invention claimed is:

1. A method for operating a field device of process automation technology, wherein the field device has stored in a memory, profile information for different servicing devices and associated with the profile information is, in each case, an identification of the corresponding servicing device, wherein the method comprises the steps of:

connecting the field device for communication with at least one servicing device; and in case of a request by a servicing device for access to the field device the servicing device transmits its identification and the field device can access the associated profile information via the received identification and as a function of said profile information allows an accessing by the servicing device, thus access allowed by the field device depends on the particular servicing device which places the access request, and on the operating state, in which the field device is operated, where in:

said operating states include an operating state with blocked or limited access, in which the field device is operated, when a request for access to the field device is placed by a servicing device and wherein said operating states of the field device, as a function of which an accessing is allowed, include at least three of the following operating states: an "offline" operating state, in which the field device is not connected in a plant of process automation technology; and "online" operating state, in which the field device is connected in a plant of process automation; a "commission" operating state ("start-up" operating state), in which parameters of the field device are set before integration of the field device into a process; a "non-commission" operating state (operating state before start-up), in which a field device, which has not previously been in operation, is present; an "off-control" operating state, in which the field device is "online", but is not, however, yet integrated into a process; an "on-control" operating state, in which the field device is "online" and integrated into a process.

2. The method as claimed in claim 1, wherein:

depending on the servicing device which places the access request and/or depending on the operating state of the field device, access allowed by the field device only includes a part of the parameters of the field device.

3. The method as claimed in claim 1, wherein:

depending on the servicing device which places the access request and/or depending on the operating state of the field device, access allowed by the field device only includes certain access types.

4. The method as claimed in claim 1, wherein:

in case of an access request, the at least one servicing device transmits an identification of the servicing tool to the field device.

5. The method as claimed in claim 1, wherein:

profile information for the at least one servicing device is saved in the field device;

the profile information includes information regarding functions of the relevant servicing device with regard to an accessing of field devices; and the field device, in case of receiving an access request by a servicing device, accesses the profile information of the servicing device, and, as a function of this profile information, allows an accessing.

6. The method as claimed in claim 1, wherein:
in the field device, upon receiving an access request by a servicing device, access by other servicing devices is blocked or enabled only to a limited degree.

7. The method as claimed in claim 6, wherein:
that the blocking or limitation of access to the field device can only be canceled by the servicing device which placed the access request, due to which access was blocked or limited.

8. The method as claimed in claim 1, wherein:
the field device, upon receiving an access request from a predetermined servicing device, allows an accessing independently of whether an access request was parallelly placed by another servicing device.

9. The method as claimed in claim 6, wherein:
when an access is blocked or enabled only to a limited degree, the field device gives a corresponding report concerning the blocking or limitation;
wherein, in the report, an identification is especially given of the servicing device, which placed the access request, due to which access was blocked or limited.

10. The method as claimed in claim 1, wherein:
in case of an access request initiated by a person, this person must identify him/herself, and access allowed by the field device depends on identity of this person.

11. A field device of process automation technology, which has stored in a memory, profile information for different servicing devices and associated with the profile information is, in each case, an identification of the corresponding servicing device, wherein the field device includes a processor unit, adapted in such a manner, that, in case of a request by a servicing device for access to the field device, access to the field device allowed by the processor unit depends on the particular servicing device, which places the access request, and on the operating state, in which the field device is operated wherein:

said operating states include an operating state with blocked or limited access, in which the field device is operated when a request for access to the field device is placed by a servicing device and wherein said operating states of the field device, as a function of which an accessing is allowed, include at least three of following operating states: an "offline" operating state, in which the field device is not connected in a plant of process automation technology; an "online" operating state, in which the field device is connected in a plant of process automation technology; a "commission" operating state ("start-up" operating state), in which parameters of the field device are set before integration of the field device into a process; a "non-commission" operating state (operating state before start-up), in which a field device, which has not previously been in operation, is present; an "off-control" operating state, in which the field device is "online", but is not, however, yet integrated into a process; an "on-control" operating state, in which the field device is "online" and integrated into a process.

* * * * *